US006484084B1

(12) United States Patent
Vohmann et al.

(10) Patent No.: US 6,484,084 B1
(45) Date of Patent: Nov. 19, 2002

(54) METHOD AND DEVICE FOR CONTROLLING AND REGULATING A COUPLING

(75) Inventors: Martin Vohmann, Esslingen; Ralf Dreibholz, Meckenbeuren, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/763,924

(22) PCT Filed: Aug. 10, 1999

(86) PCT No.: PCT/EP99/05783

§ 371 (c)(1),
(2), (4) Date: Mar. 30, 2001

(87) PCT Pub. No.: WO00/13928

PCT Pub. Date: Mar. 16, 2000

(30) Foreign Application Priority Data

Sep. 5, 1998 (DE) .......................... 198 40 573

(51) Int. Cl.[7] .......................... B60K 41/22; F16D 48/06
(52) U.S. Cl. .............................. 701/67; 701/51; 701/54; 477/46
(58) Field of Search .......................... 701/67, 51, 52, 701/53, 54, 55, 56; 477/37, 43, 46, 47, 48, 708, 107

(56) References Cited

U.S. PATENT DOCUMENTS

| 4,665,773 A | 5/1987 | Hiramatsu et al. ............. 74/866 |
| 4,805,750 A | 2/1989 | Nitz |
| 5,024,310 A | 6/1991 | Murano et al. .......... 192/0.076 |
| 5,364,317 A | 11/1994 | Amemiya .................... 475/132 |
| 6,188,943 B1 * | 2/2001 | Uchida et al. ................. 701/54 |

FOREIGN PATENT DOCUMENTS

| DE | 35 09 017 A1 | 10/1985 |
| DE | 29 23 986 C2 | 12/1987 |
| DE | 39 37 376 A1 | 5/1990 |
| DE | 39 37 976 A1 | 5/1990 |
| DE | 39 39 615 A1 | 5/1990 |
| DE | 39 39 660 A1 | 5/1990 |
| DE | 39 35 438 A1 | 5/1991 |
| DE | 42 29 585 A1 | 3/1994 |
| DE | 44 09 122 A1 | 2/1995 |
| DE | 44 24 456 A1 | 1/1996 |
| EP | 0 214 989 B2 | 5/1985 |
| EP | 0 214 989 B2 | 3/1987 |
| EP | 0 458 450 A1 | 4/1991 |
| EP | 0 707 998 A2 | 10/1995 |
| WO | 90/01431 | 2/1990 |

OTHER PUBLICATIONS

Buch. Regelungstechnik, O. Föllinger, Hüthig–Verlag, Heidelberg, 1990, pp. 370–377.
Föllinger, Dr.–Ing. E. h. Otto, Dr.–Ing. Frank Dörrscheidt and Dipl.–Ing. Manfred Klittich. CIP–Titelaufnahme der Deutschen Bibliothek, © 1990 Hüthig Buch Verlag GmbH, Heidelberg, Germany; pp. 370–377 (month is not available).

* cited by examiner

Primary Examiner—Tan Nguyen
(74) Attorney, Agent, or Firm—Davis & Bujold, P.L.L.C.

(57) ABSTRACT

The invention relates to a method and device for a coupling (2) in a motor vehicle transmission, the coupling being controlled and regulated during two operational states by way of a first regulating circuit (3). The regulated quantity corresponds to the actual value of a differential engine speed of the coupling (2). The first state corresponds to a starting action and the second state to operation with a variable transmission ratio.

17 Claims, 3 Drawing Sheets

METHOD AND DEVICE FOR CONTROLLING AND REGULATING A COUPLING

FIELD OF THE INVENTION

The invention relates to a method and a device for controlling and regulating a coupling in a motor vehicle transmission in which an electronic control unit determines the behavior of the coupling by means of a regulating circuit.

BACKGROUND OF THE INVENTION

In the sense of the invention, the coupling is to be understood as a starting clutch. Under this designation fall clutches mounted between an internal combustion engine and an automatic transmission, lock up clutches and also clutches integrated in an automatic transmission which can be used both to start and as selector clutches.

A method for controlling a starting clutch has been disclosed, e.g. in DE 44 09 122 A1. Here the starting control comprises two phases. During a first phase, the input rotational speed of the clutch is brought to a theoretical rotational speed wherein the theoretical rotational speed is established from the driver's performance standard or the gradient and a driving activity. During the second phase, the difference between the input and the output rotational speeds of the clutch is reduced, according to a theoretical value curve to zero. DE 39 37 976 A1 disclosed a method for regulating the clutch which serves to neutralize vibration. The slip of the clutch is modified according to a revolution uniformity determined from the transmission output. From EP 0 214 989 B2, in turn, the use of a clutch integrated in the automatic transmission as a starting element is known.

Departing from the above described prior art, the problem on which the invention is based is to develop it, with regard to the multiple utilization of a single coupling, in combination with an automatic transmission.

SUMMARY OF THE INVENTION

According to the invention, the problem is solved by the present invention. It is advantageous that to control and regulate the coupling exclusively during two operational states, a single regulating circuit is used. The regulated quantity corresponds to the actual value of the differential rotational speed of the coupling. The two operational states correspond to a starting operation, as a first state, and to driving with a variable ratio, as a second state.

During a continuously variable adjustment, a specific regulating circuit, hereinafter designated as a second regulating circuit, determines the behavior of the continuously variable transmission. For this case, i.e. the second state, it is proposed that the first and second regulating circuits be interconnected, via an uncoupling network, wherein the uncoupling network has first and second signal paths. By the uncoupling network, the advantage that the two controllers do not influence each other in their action is thus obtained.

For both operational states, the theoretical value of the differential rotational speed of the coupling is determined from the addition of a theoretical value offset and a ratio-dependent differential rotational speed of the coupling. According to a first characteristic field, the ratio-dependent differential rotational speed is determined for a starting ratio of the continuously variable transmission. The ratio-dependent differential rotational speed for the non-starting ratios is determined via a second characteristic field. Both the first and the second characteristic fields each show a coordination of performance standard of the driver and an output rotational speed of the coupling. The second characteristic fields are configured in a manner such that at a vehicle speed lower than a limiting value, an increased theoretical value of the rotational speed difference results. An active protection against stalling for non-starting ratios is achieved.

BRIEF DESCRIPTION OF THE DRAWING(S)

The invention is explained below with reference to the embodiments shown. In the drawings.

DETAILED DESCRIPTION OF THE INVENTION

Figure 1:
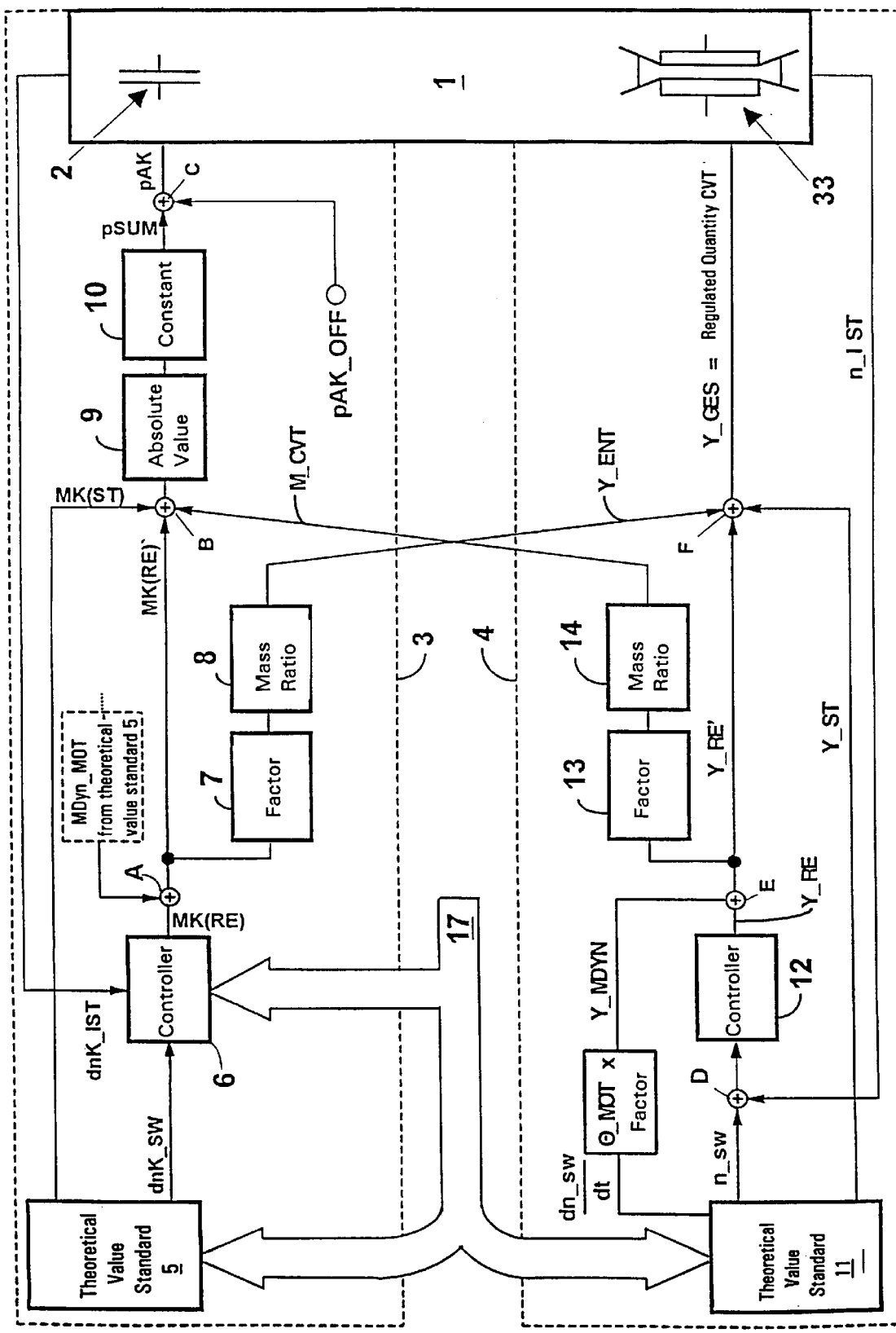
FIG. 1 is a summary of first and second regulating circuits.

FIG. 1 shows a summary of the two regulating circuits. The first regulating circuit, for controlling and regulating the coupling 2, is designated with the reference numeral 3. The second regulating circuit, for controlling and regulating a continuously variable transmission 1, is designated with reference numeral 4. In FIG. 1, a variator is shown by the reference numeral 33. By coupling 2 in the sense of the invention, a starting coupling is to be understood. This coupling can be front-mounted on the continuously variable transmission 1 or a lock-up coupling, or a coupling integrated in the transmission. Input variables 17 are fed to both the first and the second regulating circuits 3, 4. The input variables are the signal of a driver's performance standard, e.g. throttle valve information DKI or the gradient thereof, the torque of an internal combination engine (not shown), which drives the continuously variable transmission 1 and an input/output rotational speed of the coupling 2. The first regulating circuit 3 consists of the blocks: theoretical value standard 5, controller 6, factor 7, mass ratio 8, absolute value 9 and constant 10. The theoretical value standard 5 delivers the theoretical value of the differential rotational speed dnK_SW coupling 2 and the controlled torque MK(ST) of the coupling 2, as output variables, the same as the dynamic engine torque MDYN_MOT. The inner structure of the theoretical value standard 4 is explained with reference to FIG. 2. The input variables 17, the theoretical value dnK_SW of the differential rotational speed of the coupling 2, the same as the actual value dnK_IST of the differential rotational speed of the coupling 2. The inner structure of controller 6 is explained in with reference to FIG. 3. The regulated torque MK(RE) of coupling 2 is the output variable of controller 6. From the regulated torque MK(RE) of the coupling 2 and the dynamic engine torque MDYN_MOT results the regulated summation torque MK(RE)', summation point A. This is summed up at point B with the controlled torque MK(ST) of the coupling 2 generated from the theoretical value standard 5 and the uncoupling torque M_CVT of the continuously variable transmission. From this sum, by means of function block 9, an absolute value is formed and the result weighed with a constant at function block 10. The output variable is a summed up pressure pSUM. A pressure offset pAK_OFF is superimposed to this summed up pressure pSUM at summation point C. The pressure level pAK, resulting herefrom, is the pressure level acting upon the coupling 2. The second regulating circuit 4 consists of: theoretical value standard 11, controller 12, factor 13, mass ratio 14, the same as the product of engine inertia sequence of the continuously variable adjustment. From the input variables 17, the function block theoretical value standard 11 determines the theoretical value n_SW of the continuously variable adjustment, the controlled portion of the regulated quantity of the CVT Y_ST. The theoretical value n_SW is compared at summation point D with the actual value n_IST of the continuously variable adjustment. The actual value n_IST is determined from output variables of the continuously variable transmission 1. The resulting deviation is the input variable of the controller 12. The controller output value Y_RE is added at summation point E to the dynamic torque portion Y_MDYN from the theoretical value standard 11. From here results the regulated portion Y_RE'. The latter is added, at summation point F, to the controlled portion Y_ST and to the uncoupling portion Y_ENT. A regulated quantity is formed, for the continuously variable transmission from the result. The result is the regulated quantity Y_GES for the variator 33.

The first and second regulating circuits 3, 4 are interconnected via an uncoupling network. The uncoupling network contains a first signal path in which the function block 7 and the function block 8 is situated. The input variable of the first signal path is the regulated summation torque MK(RE)'. This is multiplied by a factor at function block 7. The factor is adjusted on the basis of tests. The result is weighted in function block 8 with the mass ratio of engine-mass to the sum of engine-mass and transmission-mass. The output variable is the uncoupling portion Y_ENT of coupling 2. The second signal path of the uncoupling network has function blocks 13 and 14, the input variable of which is the regulated portion Y_RE' of the continuously variable gear shift. The output variable of the second signal path is the uncoupling torque of the continuously variable ratio M_ENT.

Figure 2:
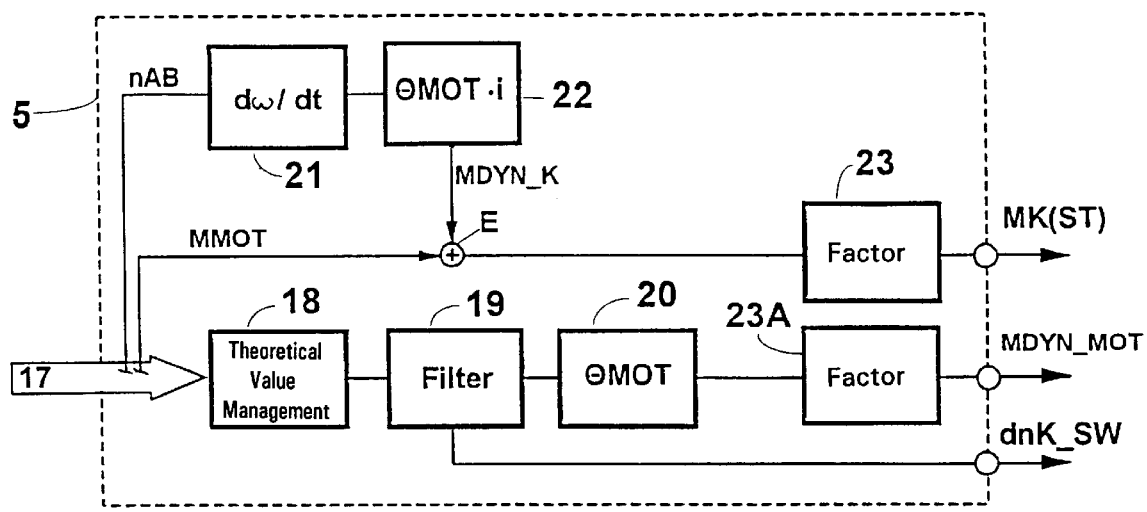
FIG. 2 is a function block theoretical value standard.

In FIG. 2 the inner structure of the theoretical value standard 5 is shown. To this is fed the input variables 17. In function block 18, theoretical value management, a rough theoretical value of the differential rotational speed of the coupling 2 is determined from the input variables rotational speed of the internal combustion engine throttle valve information DKI and torque of the internal combustion engine. The value is then filtered by filter 19 usually designed as PT1 element with a gradient limitation. An output variable of filter 19 is the theoretical value dnk_SW of the differential rotational speed of the coupling 2. This theoretical value is available at the output of the theoretical value standard 5. One other output variable of filter 19 is linked in function block 20 with the engine inertia torque Theta-MOT and a factor, reference numeral 23A. The output variable is then the dynamic torque of the internal combustion engine MDYN_MOT. From the input variable output rotational speed of the coupling nAB, the angular speed gradient dOmega/dt is determined by means of the function block 21. The result is multiplied in function block 22 by the engine inertia torque Theta-MOT and the actual ratio of the continuously variable transmission 1. The output variable is the dynamic torque MDYN_K on the coupling 2 during a continuously variable adjustment. The following equations apply here:

in the gradient adjustment phase:

$$MDYN\_K = Theta\text{-}MOT \cdot i1 \cdot dOmega/dt;$$

or in the sliding phase:

$$MDYN\_K = Theta\_MOT \cdot i2 \cdot dOmega/dt;$$

MDYN_K: dynamic torque coupling;
Theta_MOT: the inertia torque of the internal combustion engine;
i1: first ratio step;
i2: second ratio step;
dOmega/dt: gradient angular speed coupling.

At summation point E, the dynamic torque of coupling 2 is then linked with torque MMOT generated by the internal combustion engine. The result is added, at summation point F, to the previously calculated dynamic torque of the internal combustion engine MDYN_MOT. The result is weighted in function block 23 with an adjustable factor, and the output variable of which is the controlled torque MK(ST) of coupling 2.

Figure 3:
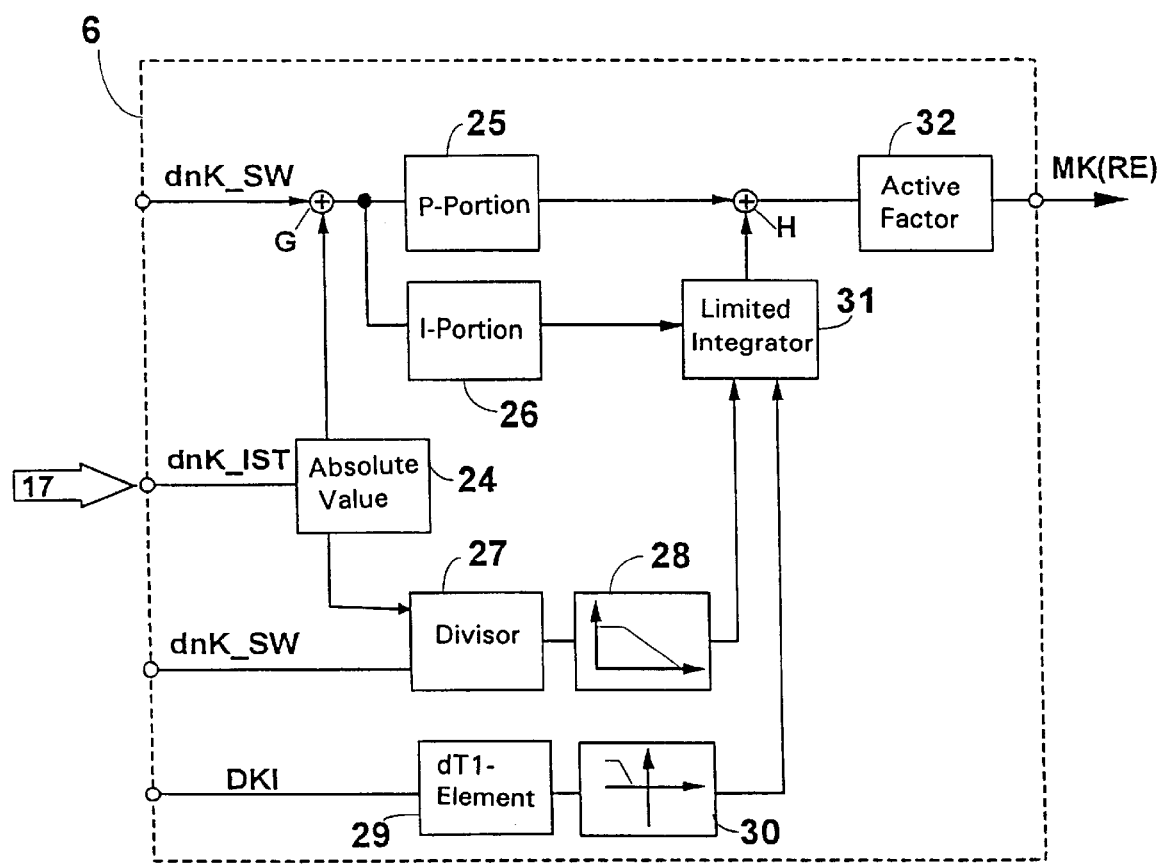
FIG. 3 is a function block controller.

FIG. 3 shows the inner structure of controller 6. To this is fed the input variables 17, the same as the theoretical value dnK_SW and the actual value dnK_IST of the differential rotational speed of coupling 2. The absolute value is formed in function block 24 from the actual value dnK_IST. The absolute value is then the input variable for divisor 27 and summation point G. The theoretical value dnK_SW of the differential rotational speed of the coupling 2 is passed as a second input variable to divisor 27. The quotient is passed to function block 28, characteristic line dynamic lowering. Over the characteristic line is artificially increased at very low slipping values such as less than 19 revolutions, the input value of integrator 31. An additional ramp-like pressure reduction is obtained. The zero point results from a ratio of actual to theoretical value of the rotational speed difference of coupling 2. The input variable throttle valve information DKI is the input signal for a dT1-element 29. The output signal of this filter is then the input signal for the "quickly open" characteristic line 30. The input value of integrator 31 is artificially increased over this characteristic line during quick gas re-utilization according to the driver's desired performance or the gradient thereof. An additional ramp-like pressure reduction results. The pressure reduction can be changed over the characteristic line.

At summation point G, the theoretical value dnK_SW is summed up with the absolute value of the actual value of the differential rotational speed coupling 2 formed in function block 24. On one hand, the result is then passed parallel, via a function block P-portion 25 and, on the other, via an I-portion 26. The output variable of the P-portion 25 acts upon summation point H. The output variable of function block 26 acts upon the limited integrator 31. The output value of the limited integrator 31 is linked, at summation point H, with the proportional part from function block 25 and passed to the active factor function block 32. Via the active factor, the direction in which the actual regulating torque must act. This is needed to determine the uncoupling portion Y_ENT is determined.

Figure 4:
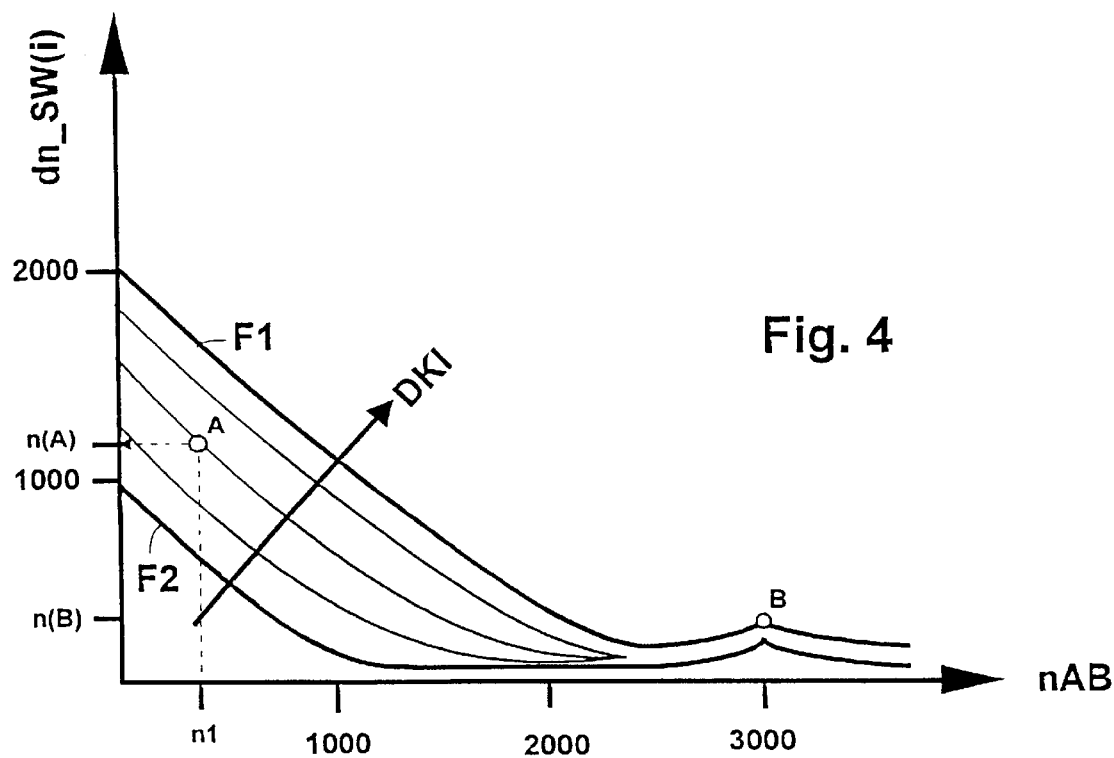
FIG. 4 is a first characteristic field for starting ratios.

In FIG. 4 a first characteristic field KF1(i) of the continuously variable transmission 1 is shown. The characteristic field is used for a starting operation. A gear-dependent differential rotational speed dn_SW(i) is determined by means of the characteristic field KF1(i). Input variable of the first characteristic field is the output rotational speed nAB of the coupling 2, the same as the throttle valve information DKI. A range defined by the two limiting lines F1 and F2 is shown within the characteristic field. The limiting line F2 corresponds to the throttle valve value of 0%. The limiting line F1 corresponds to the throttle valve value of 100%. An assemblage of characteristic lines of several throttle valve values is shown within the range. The sequence of the method is the following: the operating point A results from the actual output rotational speed value nAB of coupling 2, the value n1, and the actual throttle valve value, such as 50%. From this, in turn, results the gear-dependent differential rotational speed value dnK_SW(i), here the value nA. In FIG. 4 a rotational speed overshoot, point B, at an output rotational speed of 3000 revolutions is additionally plotted. Via the rotational speed overshoot n(B) a neutralization of vibrations between internal combustion engine and output of continuously variable transmission 1 is obtained. The position of point B or value n(B) depends on the internal combustion engine used and is defined in the adaptation phase of the continuously variable transmission.

Figure 5:
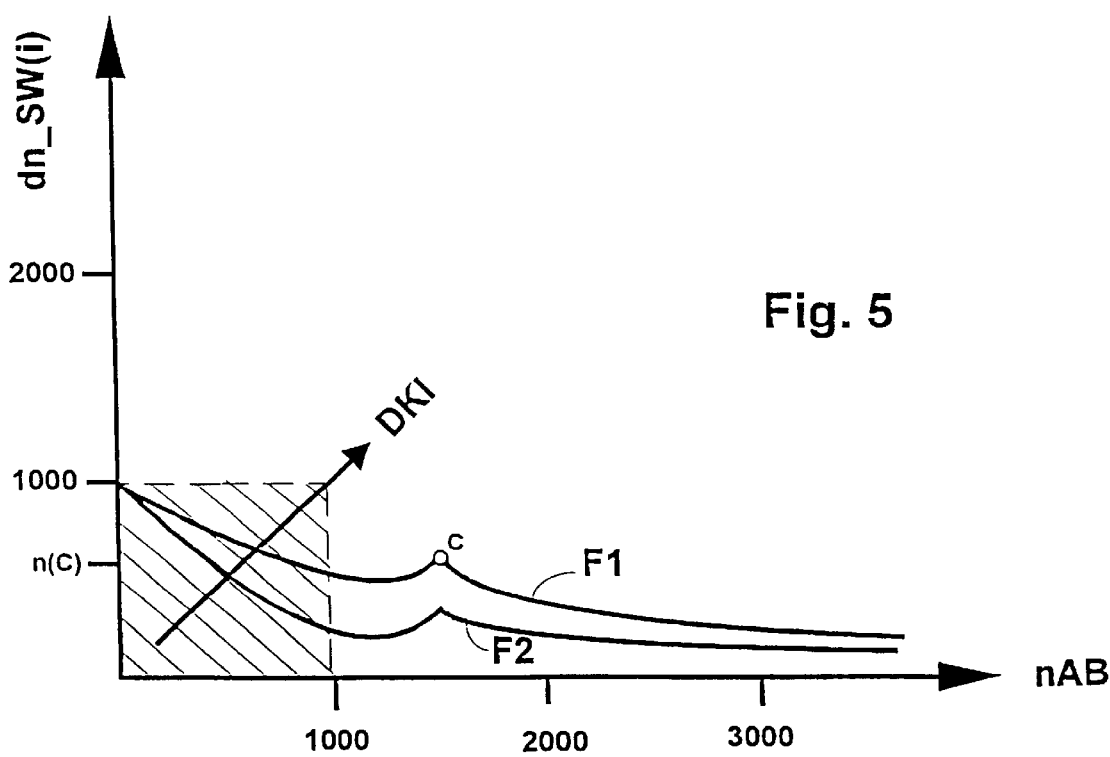
FIG. 5 is a second characteristic field for non-starting ratios.

In FIG. 5 a second gear-dependent characteristic field KF2(i) is shown. Via this second characteristic field KF2(i) the differential rotational speed dn_SW(i), for non-starting ratios of the continuously variable transmission, is determined. The input and output variables correspond to those of the first characteristic field. The characteristic field also contains a range defined by the two limiting characteristic lines F1 and F2. The limiting line F2 corresponds to 0% and the limiting line F1 corresponds to 100% throttle valve information DKI. Point C is plotted on limiting line F1. This rotational speed overshoot value n(c) causes the coupling to be kept in slipping state so as to obtain an active neutralization of vibration. A shaded range is shown within the characteristic field. The range serves for protection against stalling, i.e. at low output rotational speed nAB of coupling 2, it is loaded with a defined theoretical value of the differential rotational speed. The stalling protection is also calculated according to the following equation:

```
dnK_SW(i) > NMOT)_MIN-nAB;
NMOT_MIN:    is the minimal rotational speed of the internal
             combustion engine;
nAB:         is an output rotational speed of coupling 2.
```

The first characteristic field KF1(1) with i=1 or 2 is used for a starting ratio. The second characteristic field KF2(i), i=3 to n, is used for non-starting ratios. A specific characteristic field thus exists for each ratio. The transition from the first KF1(i) to the second KF2(i) characteristic field occurs during continuously variable adjustment of the continuously variable transmission 1. This means that the curve of the characteristic lines, according to the first characteristic field KF1(i) of FIG. 4, is approximated, via intermediate characteristic fields, to a curve according to FIG. 5. These characteristic fields are not shown.

The sequence of this inventive method is as follows. In the first stage, that is, in the starting ratio, the ratio-dependent differential rotational speed dn_SW(i) is determined by means of the first characteristic field KF1(i). The value corresponds to the theoretical value of the differential rotational speed dnK_SW of coupling 2, since the theoretical value offset dnK_SW is zero. With increasing output rotational speed nAB of coupling 2, this theoretical speed is reduced, according to FIG. 4, for increasing the comfort a higher theoretical value is adjusted in order to achieve a neutralization of vibrations. If a continuously variable adjustment is now initiated, a change is effected from the first characteristic field KF1(i) to the second characteristic field KF2(i), according to FIG. 5. During the continuously variable adjustment, an uncoupling portion M_CVT is added, via the uncoupling network, by the second signal path to the controlled torque MK(ST) and regulated summation torque MK(RE)'. An uncoupling portion Y_ENT of coupling 2 is added to the variator 33 to be adjusted via the first signal path.

| Reference numerals | |
|---|---|
| 1 | continuously variable transmission |
| 2 | coupling |
| 3 | first regulating circuit |
| 4 | second regulating circuit |
| 5 | theoretical value standard |
| 6 | controller |
| 7 | factor |
| 8 | calculation block mass ratio |
| 9 | absolute value |
| 10 | constant |
| 11 | theoretical value standard |
| 12 | controller |
| 13 | factor |
| 14 | calculation block: mass ratio |
| 15 | — |
| 16 | — |
| 17 | input variables |
| 18 | theoretical value management |
| 19 | filter |
| 20 | inertia torque |
| 21 | calculation block dOmega/dt |
| 22 | calculation block |
| 23, 23A | factor |
| 24 | absolute value |
| 25 | P-portion |
| 26 | I-portion |
| 27 | divisor |
| 28 | characteristic line dynamic lowering |
| 29 | dT1 element |
| 30 | characteristic line "quickly open" |
| 31 | limited integrator |
| 32 | active factor |
| 33 | variator |
| dn_SW(i) | ratio-dependent differential rotational speed |
| dnK_SW | theoretical value differential rotational speed coupling |
| dnK_IST | actual value differential rotational speed coupling |
| MK(ST) | controlled torque coupling |
| MK(RE) | regulated torque coupling |
| Y_ENT | uncoupling portion of the regulated quantity of the variator |
| pAK_OFF | pressure offset starting coupling |
| pSUM | summed up pressure |
| pAK | pressure level coupling |
| MDYN_K | dynamic torque coupling |
| pLS_OFF | pressure offset gear shift under load |
| nAB | output rotational speed coupling |
| n_SW | theoretical value rotational speed |
| n_IST | actual value rotational speed |
| Y_ST | controlled portion of the regulated quantity of the variator |
| Y_RE | regulated portion of the regulated quantity of the variator |
| Y_RE' | sum of the portions Y_RE and Y_MDYN |
| Y_ENT | uncoupling portion of the regulated quantity of the variator |
| Y_MDYN | theoretical gradient portion of the regulated quantity of the variator |
| Y_GES | regulated quantity for variator |
| MMOT | engine torque |
| MDYN_MOT | dynamic engine torque |
| M_CVT | uncoupling torque of the variator regulation |
| DKI | throttle valve information = load position |
| dnLS_SW | theoretical value offset |
| Theta-MOT | engine inertia torque |
| i_CVT | actual variator ratio |

What is claimed is:

1. A method and device for controlling and regulating a coupling (2) for a motor vehicle transmission in which an electronic control unit determines, via a regulating circuit, behavior of the coupling (2), the method comprising the steps of:

using a first regulating circuit (3) for controlling and regulating the coupling (2) both in a first operational state corresponding to a starting operation and in a second operational state corresponding to driving with a variable ratio (i=var);

equating a regulated quantity for the first regulating circuit to an actual value of a differential rotational speed (dnK_IST) of the coupling (2); and determining a continuously variable adjustment of the continuously variable transmission (1) by a second regulating circuit (4) with the first regulating circuit (3) and second regulating circuit (4) being interconnected via an uncoupling network (7, 8, 13, 14).

2. The method and device according to claim 1, further comprising the step of providing the uncoupling network with a first (7, 8) and a second (13. 14) signal path.

3. The method and device according to claim 2, further comprising the step of providing the continuously variable adjustment of the transmission (1), the first regulating circuit (3) acting (Y_ENT) upon the second regulating circuit (4), via the uncoupling network, by the first signal path (7, 8) and the second regulating circuit (4) acting upon the first regulating circuit (3), via the uncoupling network by the second signal path (13, 14).

4. The method and device according to claim 3, further comprising the step of generating the uncoupling portion (Y_ENT) of the coupling (2) from a sum of a dynamic engine torque (MDYN_MOT) and a regulated torque (MK(RE)) of the coupling (2), the same as a mass ratio engine/continuously variable transmission (8) and a factor (7).

5. The method and device according to claim 2, further comprising the step of determining the ratio-dependent differential rotational speed (dn_SW(i)) for a starting ratio of the continuously variable transmission via a first characteristic field (KF1(i), i=1, 2) constituting a coordination of the driver's performance standard (DKI) and output rotational speed (nAB) of the coupling (2).

6. The method and device according to claim 5, further comprising the step of corresponding a ratio, which is interpolated between adjacent characteristic fields according to the relevant actual ratio, to each characteristic field such, as KF1(i) or KF2(i).

7. The method and device according to claim 1, further comprising the step of providing the pressure level (pAK) of the coupling (2) results from an offset value (pAK_OFF) and a summation value (pSUM) (pAK=pAK_OFF+pSUM), determining the summation value (pSUM) from a balance of the controlled (MK(ST)) of the coupling (2), and uncoupling power shift torque (MLS_ENT) (pSUM=f(MK(ST), MK(RE)', MLS_ENT)).

8. The method and device according to claim 7, further comprising the step of determining the controlled torque (MK(ST)) from the dynamic torque of the coupling (MDYN_K) and the engine torque (MMOT) MK(ST)=f(MDYN_K, MMOT).

9. The method and device according to claim 7, further comprising the step of determining the regulated summation torque (MK(RE)') of the coupling (2) from the dynamic engine torque (MDYN_MOT) and a regulated torque (MK(RE)) of the coupling (2).

10. The method and device according to claim 9, further comprising the step of determining the regulated torque (MK)RE)) from the theoretical/actual comparison of a rotational speed difference (dnK_SW, dnK_IST) of the coupling (2) and a performance standard (DKI) of a driver via a controller (6).

11. The method and device according to claim 7 further comprising the step of generating the uncoupling portion of the torque of the continuously variable transmission part (M_CVT) from the theoretical gradient portion of the regulated quantity of the continuously variable transmission (Y_MDYN) and a regulated adjusting portion (Y_R), the same as a mass ratio engine/continuously variable transmission (14) and a factor (13).

12. The method and device according to claim 11, further comprising the step of calculating a mass ratio from a variable of a rotary mass and of an actual ratio i_CVT.

13. The method and device according to claim 1, wherein the controller (6) contains a limited integrator (31) and the method further comprising the step of feeding, as input variables to the integrator (31), a deviation from the theoretical/actual comparison of the rotational speed difference (dnK_SW, dnK_IST) of the coupling (2), the adjustment speed of the performance standard (DKI) and the ratio actual to theoretical value of the differential rotational speed (dnK_IST/dnK_SW) of the coupling (2).

14. The method and device according to claim 1, further comprising the step of, for both operational states, generating the theoretical value of the differential rotational speed (dnK_SW) of the coupling (2) from the addition of a theoretical value offset (dnLS_SW) and a ratio-dependent differential rotational speed (dn_SW(i)) of the coupling (2).

15. The method and device according to claim 14, further comprising the step of determining the ratio-dependent differential rotational speed (dn_SW(i) for non-starting ratios of the continuously variable transmission via second characteristic fields (KF2(i), i=3 . . . n), constituting a coordination of the driver's performance standard (DKI) and the output rotational speed (nAB) of the coupling (2).

16. The method and device according to claim 15, further comprising the step of adjusting an increased differential rotational speed (dn_SW(i)) of the coupling for stall protection, at a vehicle speed (v) lower than a limiting value (GW), via a relevant second characteristic field (KF(i)).

17. The method and device according to claim 15, further comprising the step of calculating an increased differential rotational speed (dn_SW(i)) of the coupling, during the second operation state at a vehicle speed (v) lower than a limiting value (GW), from stall protection according to the following equation:

$$dn\_SW(i) > NMOT\_MIN - nAB$$

where:

NMOT_MIN: is a minimum rotational speed of an internal combustion engine; and nAB: is an output rotational speed of the coupling (2).

* * * * *